United States Patent
Ciochina et al.

(10) Patent No.: US 10,911,115 B2
(45) Date of Patent: Feb. 2, 2021

(54) COMMUNICATION DEVICES AND METHODS WITH BEAMFORMING TRAINING

(71) Applicant: Sony Corporation, Tokyo (JP)

(72) Inventors: Dana Ciochina, Stuttgart (DE); Thomas Handte, Stuttgart (DE)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/343,409

(22) PCT Filed: Oct. 27, 2017

(86) PCT No.: PCT/EP2017/077655
§ 371 (c)(1),
(2) Date: Apr. 19, 2019

(87) PCT Pub. No.: WO2018/078124
PCT Pub. Date: May 3, 2018

(65) Prior Publication Data
US 2019/0245600 A1 Aug. 8, 2019

(30) Foreign Application Priority Data
Oct. 27, 2016 (EP) .................................... 16195985

(51) Int. Cl.
*H04B 7/06* (2006.01)
*H04B 7/0417* (2017.01)

(52) U.S. Cl.
CPC ......... *H04B 7/0617* (2013.01); *H04B 7/0417* (2013.01); *H04B 7/0619* (2013.01)

(58) Field of Classification Search
CPC .... H04B 7/0695; H04B 7/088; H04B 7/0617; H04B 7/0417; H04B 7/0619; H04W 16/28
See application file for complete search history.

(56) References Cited

U.S. PATENT DOCUMENTS

2009/0232240 A1 9/2009 Lakkis
2010/0159845 A1* 6/2010 Kaaja .................... H04B 7/088
455/70
(Continued)

FOREIGN PATENT DOCUMENTS

JP 2016-509818 A 3/2016
WO 2011/034734 A2 3/2011
(Continued)

OTHER PUBLICATIONS

International Search Report dated Dec. 21, 2017 for PCT/EP2017/077655 filed on Oct. 27, 2017, 14 pages.
(Continued)

*Primary Examiner* — Sung S Ahn
(74) *Attorney, Agent, or Firm* — Xsensus, LLP

(57) ABSTRACT

A communication device for RF-based communication with another communication device. The communication device comprising antenna circuitry configured to transmit and receive RF signals and beamforming circuitry configured to perform beamforming and to control the antenna circuitry in a beamforming training phase to transmit and/or receive RF signals using one or more selected directive beams. The beamforming circuitry is configured to perform beamforming training by controlling the antenna circuitry i) to transmit data using at least one first directive transmit beam, wherein the other communication device is configured to listen using a first directive receive beam, said data including a second transmit beam information, and ii) to subsequently listen using a predetermined second directive receive beam for a response from the other communication device.

19 Claims, 8 Drawing Sheets

(56) References Cited

U.S. PATENT DOCUMENTS

| | | |
|---|---|---|
| 2013/0044695 A1 | 2/2013 | Xu et al. |
| 2014/0307654 A1 | 10/2014 | Kim |
| 2015/0341105 A1 | 11/2015 | Yu et al. |
| 2016/0088558 A1 | 3/2016 | Chu et al. |

FOREIGN PATENT DOCUMENTS

| | | |
|---|---|---|
| WO | 2011/043901 A2 | 4/2011 |
| WO | 2013/184323 A1 | 12/2013 |
| WO | 2015/089303 A1 | 6/2015 |
| WO | 2015/099750 A1 | 7/2015 |
| WO | 2016/108589 A1 | 7/2016 |

OTHER PUBLICATIONS

Nitsche et al., "IEEE 802.11ad: Directional 60 GHz Communication for Multi-Gbps Wi-Fi", IEEE Communications Magazine, vol. No. 52, No. 12, 2014, pp. 132-141.

IEEE, "Wireless LAN Medium Access Control (MAC) and Physical Layer (PHY) Specifications", Amendment 3: Enhancements for Very High Throughput in the 60 GHz Band, IEEE Std. 802.11 adTM, Dec. 28, 2012, pp. 1-598.

Office Action dated Sep. 23, 2020, in corresponding Japanese patent Application No. 2019-522934, 27 pages.

James Wang et al., "Scalable Beamforming for 11ay", Jan. 18, 2016, doc.:IEEE 802.11-16/0099r0, total 13 pages, URL:https://mentor.ieee.org/802.11/dcn/16/11-16-0099-00-00ay-scalable-beamforming-for-11ay.pptx.

Yan Xin et al., "Channel Access in A-BFT over Multiple Channels", Jan. 21, 2016, doc.:IEEE 802.11-16/0101r0, total 9 pages, URL:https://mentor.ieee.org/802.11/dcn/16/11-16-0101-00-00ay-channel-access-in-a-bft-over-multiple-channels.pptx.

\* cited by examiner

| B0 | B1 | B2 B5 | B6 | B7 B9 | B10 B13 | B14 |
|---|---|---|---|---|---|---|
| CC Present | Discovery Mode | Next Beacon | ATI Present | A-BFT Length | FSS | IsResponderTXSS |

Bits: 1 · 1 · 4 · 1 · 3 · 4 · 1

| B15 B18 | B19 | B20 B26 | B27 B30 | B31 B36 | B37 B42 | B43 | B44 B47 |
|---|---|---|---|---|---|---|---|
| Next A-BFT | Fragmented TXSS | TXSS Span | N Bis A-BFT | A-BFT Count | N A-BFT in Ant | PCP Association Ready | Reserved |

Bits: 4 · 1 · 7 · 4 · 6 · 6 · 1 · 4

Fig. 8

| DD-A-BFT Length | FSS | Next DD-A-BFT | DD-A-BFT Count | N DD-A-BFT in Ant | Reserved |
|---|---|---|---|---|---|
| 3 | 4 | 4 | 6 | 6 | 1 |

Bits:

Fig. 10

| DD-A-BFT Length | FSS | Next DD-A-BFT | Fragmented DD-A-BFT | DD-A-BFT span | DD-A-BFT Count | N DD-A-BFT in Ant | Reserved |
|---|---|---|---|---|---|---|---|
| 3 | 4 | 4 | 1 | 7 | 6 | 6 | 1 |

Bits:

Fig. 11

| Order | Information | Notes |
|---|---|---|
| 1 | Timestamp | See 8.4.1.10 |
| 2 | Sector Sweep | See 8.4a.1 |
| 3 | Beacon Interval | See 8.4.1.3 |
| 4 | Beacon Interval Control | See Figure 8-34b. |
| 5 | DMG Parameters | See 8.4.1.46 |
| 6 | Clustering Control | Optional. See Figure 8-34c and Figure 8-34d. |
| 7 | DMG Capabilities | The DMG Capabilities element is optionally present. |
| 8 | Extended Schedule | The Extended Schedule element is optionally present. |
| 9 | RSN | The RSNE is optionally present if dot11RSNAEnabled is true. |
| 10 | Multiple BSSID | One or more Multiple BSSID elements are optionally present if dot11MgmtOptionMultiBSSIDEnabled is true. |
| 11 | DMG Operation | The DMG Operation element is optionally present. |
| 12 | Next DMG ATI | The Next DMG ATI element is optionally present. |
| 13 | DMG BSS Parameter Change | The DMG BSS Parameter Change element is optionally present. |
| 14 | Multi-band | The Multi-band element is optionally present if dot11MultibandImplemented is true. |
| Last – n | One or more elements can appear in this frame. These elements follow all other elements that are not vendor-specific elements and precede all other elements that are vendor-specific elements that are part of the Last field in the frame. Except for the Multi-band element, an element can be included only once in the frame. | Optional |
| Last | Vendor Specific | One or more vendor-specific elements are optionally present. These elements follow all other elements. |

Fig. 9

COMMUNICATION DEVICES AND METHODS WITH BEAMFORMING TRAINING

CROSS-REFERENCE TO RELATED APPLICATIONS

The present application is based on PCT filing PCT/EP2017/077655, filed Oct. 27, 2017, which claims priority to EP 16195985.3, filed Oct. 27, 2016, the entire contents of each are incorporated herein by reference. This disclosure is also related to co-pending U.S. application Ser. No. 16/343,416, which is entitled "COMMUNICATION DEVICES AND METHODS WITH BEAMFORMING TRAINING" filed concurrently with the present application, which is also incorporated herein by reference.

BACKGROUND

Field of the Disclosure

The present disclosure relates to different communication devices, such as a mobile station and an access point, which are configured for RF-based communication with each other. The present disclosure further relates to corresponding communication methods.

Description of Related Art

Communication systems in the 60 GHz frequency range suffer from strong free space path loss, which increases with frequency. For instance, a 60 GHz communication system has roughly 22 dB higher attenuation compared to a communication system operating at 5 GHz. To overcome the increased path loss, 60 GHz or any mmWave communication system employs beamforming, i.e. transmitter and/or receiver feature a steerable phased-array antenna (PAA), which can form directive beams towards the other communication device. Such beams have typically a high directivity and are spatially very narrow. The directivity in main direction increases with the number of antenna elements per PAA. In contrast, the half-power beam width (HPBW) defines the spatial width of a pattern decreases with increasing number of antennas. Thus, the more antennas per PAA, the higher the directivity and the smaller the HPBW. In order to make use of the PAA directivity for communications, beam alignment is crucial and of high importance for mmWave communication systems and RF communication systems, methods and devices in general.

There is a need in such communication systems to yield higher antenna gain in an association phase, thus increasing the AP coverage and enabling long-range association and data transmission. Furthermore, it is desired to reduce the collision probability among STAs (first communication devices) during association phase.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide communication devices and corresponding communication methods yielding a higher antenna gain, enabling long-range association and data transmission, and/or reducing the collision probability in association phase.

According to an aspect there is provided a (first) communication device comprising
  an antenna circuitry configured to transmit and receive RF signals, and
  a beamforming circuitry configured to perform beamforming and to control the antenna circuitry in a beamforming training phase to transmit and/or receive RF signals using one or more selected directive beams, wherein the beamforming circuitry is configured to perform beamforming training by controlling the antenna circuitry
    i) to transmit data using at least one first directive transmit beam, wherein the other communication device is configured to listen using a first directive receive beam, said data including a second transmit beam information, and
    ii) to subsequently listen using a predetermined second directive receive beam for a response from the other communication device, which is configured to transmit, if the data transmitted in step i) have been received, a response using a second directive transmit beam indicated by the second transmit beam information.

According to a further aspect there is provided a (second) communication device comprising
  an antenna circuitry configured to transmit and receive RF signals,
  a beamforming circuitry configured to perform beamforming and to control the antenna circuitry, in a beamforming training phase, to transmit and/or receive RF signals using one or more selected directive beams, wherein the beamforming circuitry is configured to perform beamforming training by controlling the antenna circuitry
    i) to listen using a first directive receive beam for data transmitted by the other communication device using at least one first directive transmit beam, said data including a second transmit beam information, and
    ii) to subsequently transmit, if the data transmitted in step i) have been received, a response using a second directive transmit beam indicated by the second transmit beam information, wherein the other communication device is configured to listen using a predetermined second directive receive beam.

According to still further aspects corresponding communication methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed methods, the disclosed computer program and the disclosed computer-readable recording medium have similar and/or identical further embodiments as the claimed devices and as defined in the dependent claims and/or disclosed herein.

One of the aspects of the disclosure is to provide association beamforming training, which applies directive beams on least the second communication device (AP), preferably on both communication devices (AP and STA). This yields an increase in link budget during the association phase, which can be exploited to extend association range, i.e. long range association beamforming training. Thus, first communication devices being far away from the second communication device can discover and join the basic service set (BSS) of that second communication device. Further, it is proposed to modify channel access during the association beamforming training if reciprocity can be assumed. This reduces the collision probability between first communication devices by exploiting their inherent spatial beam separation.

In the following, the terminology of WLAN systems is used, i.e. there is a station (STA) as an example of a first communication device and a single central network access point (AP) or personal basic service set control point (PCP) (generally referred to as AP herein; WLAN terminology sometimes uses the abbreviation PCP/AP) as an example of a second communication device, wherein the first and second communication devices may also be called transmitter and receiver. Both communication devices intend to exchange data wirelessly in the 60 GHz (mmWave) frequency band. However, this disclosure is applicable to any other RF communication system employing beamforming such as mmWave LTE.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 8 shows a diagram of a Beacon Interval Control Field;

FIG. 9 shows a diagram of beacon frame body structure;

FIG. 10 shows a diagram of a simple association beamforming control field; and

FIG. 11 shows a diagram of an advanced association beamforming control field.

DETAILED DESCRIPTION OF THE EMBODIMENTS

Figure 1:
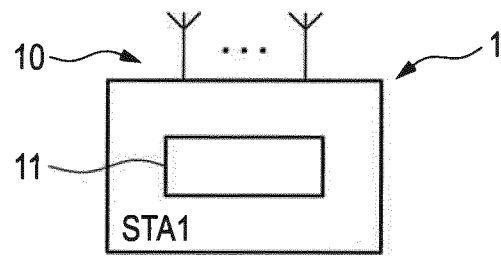
FIG. 1 shows a schematic diagram of a communication system including first and second communication devices.
Figure 1:
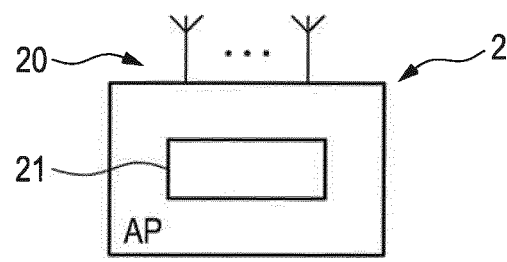
Figure 1:
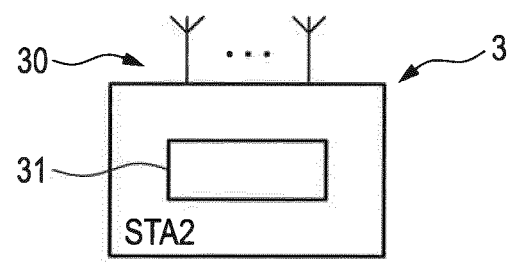

Referring now to the drawings, wherein like reference numerals designate identical or corresponding parts throughout the several views, FIG. 1 shows a schematic diagram of a communication system including first communication devices 1, 3 (stations STA1, STA2) and a second communication device 2 (an access point AP). Each of the first communication devices 1, 3 comprises an antenna circuitry (sometimes also called antenna unit) 10, 30 configured to transmit and receive RF signals, and a beamforming circuitry (sometimes also called beamforming unit) 11, 31 configured to perform beamforming and to control its antenna circuitry 10, 30. Similarly, the second communication devices 2 comprises an antenna circuitry 20 configured to transmit and receive RF signals, and a beamforming circuitry 21 configured to perform beamforming and to control its antenna circuitry 20. More details of their operation will be described below.

Communication systems in the 60 GHz frequency range suffer from strong free space path loss $a_{fs}$ which increases with frequency:

$$a_{fs}[dB]=-147.55 \text{ dB}+20 \log_{10}f+20 \log_{10}d$$

This formula above gives the free space path loss in dB as a function of frequency f and link distance d. Apparently, a 60 GHz communication system has roughly 22 dB higher attenuation compared to a communication system operating at 5 GHz.

To overcome the increased path loss, 60 GHz or any mmWave communication system employs beamforming, i.e. transmitter and/or receiver feature an antenna circuitry, e.g. a steerable phased-array antenna (PAA), which can form directive beams towards the another communication device. Such beams have typically a high directivity and are spatially very narrow. The directivity in main direction increases with the number of antenna elements per PAA. In contrast, the half-power beam width (HPBW) defines the spatial width of a pattern decreases with increasing number of antennas. Thus, the more antennas per PAA, the higher the directivity and the smaller the HPBW. In order to make use of the PAA directivity for communications, beam alignment is crucial and of high importance for mmWave communication systems.

In the following description of exemplary embodiments, the terminology of WLAN system will be used, i.e. there is a station (STA) and a single central network access point (AP) or personal basic service set control point (PCP), i.e. the term AP as used herein shall be understood generally to reference either an AP or a PCP (also referenced as PCT/AP sometimes in WLAN terminology). Both intend to exchange data wirelessly in e.g. the 60 GHz (mmWave) frequency band. However, this disclosure is not limited to this frequency band, but is applicable to any other communication system employing beamforming such as mmWave LTE for example.

This disclosure particularly addresses the association phase (also called beamforming training phase or association beamforming training phase) during which STAs discover and associate to an AP. This phase is in particular challenging since initial beam alignment needs to be performed.

Figure 2:
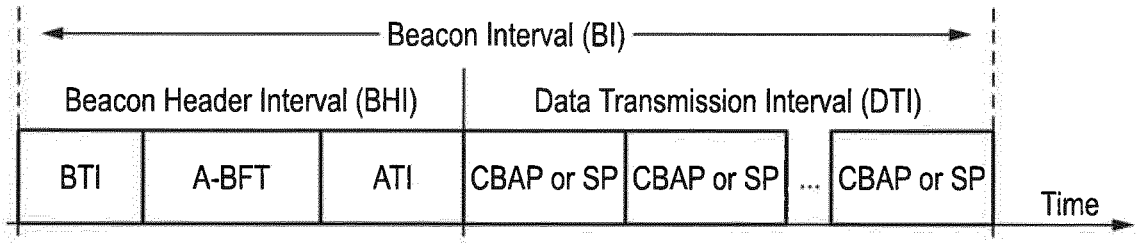
FIG. 2 shows a diagram of a transmission interval as described in IEEE802.11ad.

FIG. 2 shows a diagram of a transmission interval as described in IEEE802.11ad. The beacon interval (BI) is continuously repeated and the beacon header interval (BHI) holds all phases with respect to association. The actual data transfer occurs in data transmission interval (DTI). Since it is desired to keep DTI long compared to the BHI, the association beamforming training (A-BFT) phase and the announcement transmission interval (ATI) in BHI can be occasionally turned off, which is indicated in beacon frames sent during BTI.

Generally, according to IEEE802.11ad during a beacon transmission interval (BTI), the AP transmits identification data over various directive beams which have their main directivity in different spatial directions. An STA listens to the medium, e.g. with an (quasi) omni-directional (also called "quasi-omni" hereinafter) or wide beam antenna, i.e. no directive pattern is applied. Once a STA receives the AP identification data, it remembers the sector ID which has been applied for this message. Furthermore, it (e.g. randomly) chooses a time slot to transmit in the opposite direction (STA→AP) during association beamforming training (A-BFT) phase which follows subsequently to the BTI. In A-BFT, the STA transmits data with various directive beams to the AP, which listens with an (quasi) omni-directional antenna. The STA transmit data holds the best sector ID of the previous BTI. When the STA stops transmitting and the AP successfully received at least one message, the AP confirms reception including the STA sector which was received in best quality (e.g. highest SNR). This message is transmitted via the beam corresponding to the best sector ID indicated in previous A-BFT phase. The actual association procedure takes place in the following announcement transmission interval (ATI). In the ATI, the best beams indicated by best sector IDs of BTI and A-BFT are employed.

Figure 3:
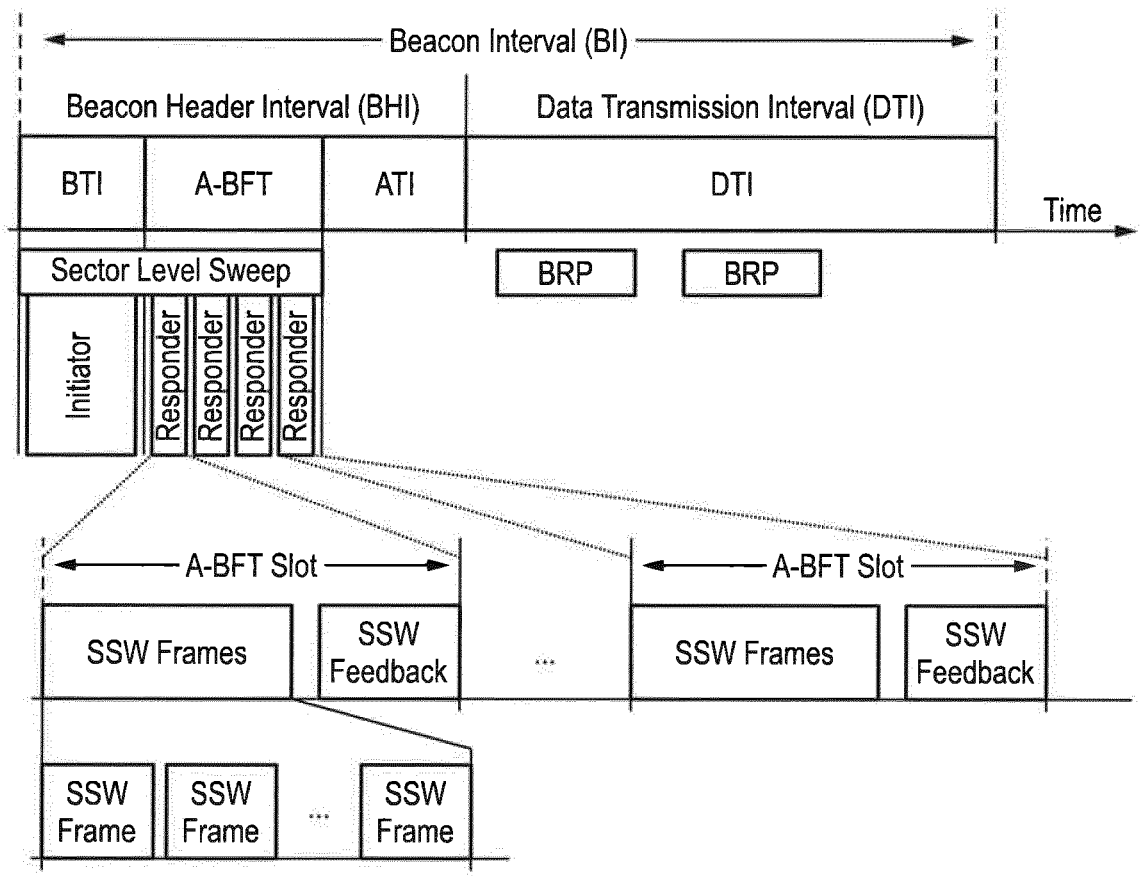
FIG. 3 shows a diagram of conventional association beamforming training.

In A-BFT, several STAs can compete for channel access. Therefore, the A-BFT is split in serval slots as depicted in FIG. 3, which shows a diagram of conventional association beamforming training. Here, the A-BFT is exemplarily split in 4 slots where STAs can respond. STAs which would like to associate with the AP choose randomly a single slot. This reduces the likelihood of a collision. In case a collision happens, the AP is able to detect and it avoids sending the SSW feedback frame which is a reception confirmation. In case the SSW feedback is sent, it holds information about the best transmit sector ID of the STA. STAs not receiving the SSW feedback choose randomly a further A-BFT slot which could be even in an upcoming BI. The actual sweep of different antenna sectors within a single A-BFT slot is done in the SSW frames. Each SSW frame is transmitted with a distinct antenna sector which has a sector ID label indicated within the same SSW frame.

The above described operation has the drawback that association happens in directive-to-omni (D2O) mode which allows for less antenna gain compared to a directive-to-directive (D2D) mode. Hence, according to the present disclosure an association phase employing D2D yielding higher antenna gain in association phase is employed, thus increasing the AP coverage and enabling long range association and data transmission. Furthermore, double directive beamforming allows for spatial reuse during the association phase which can be exploited to reduce collision probability among STAs during association phase.

Figure 4:
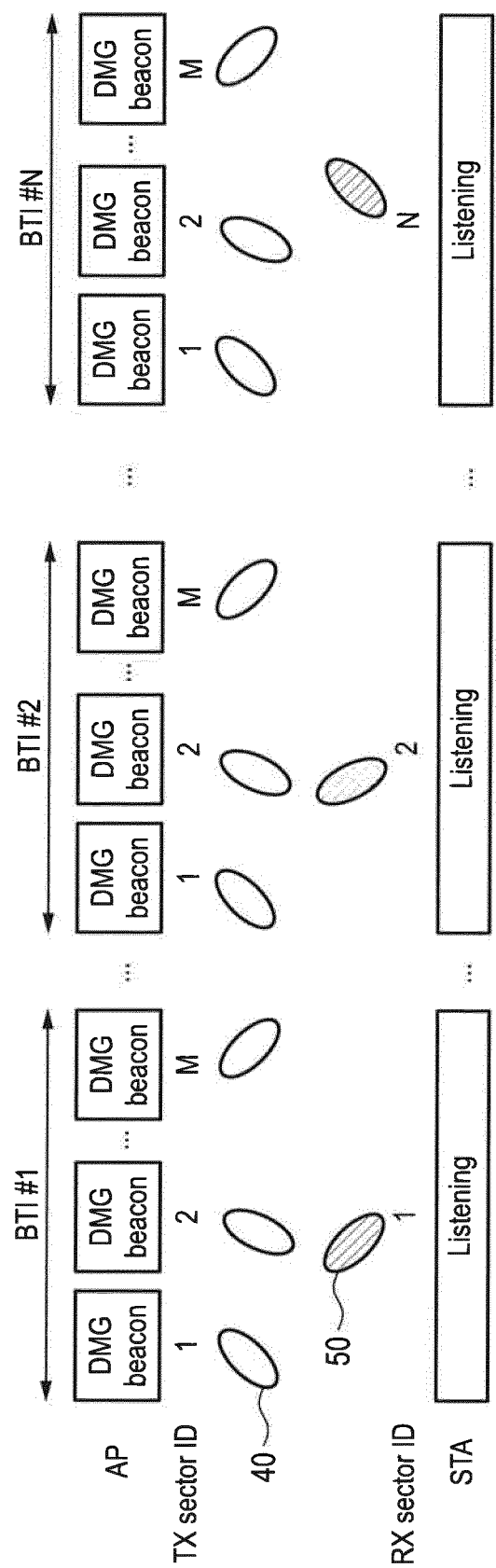
FIG. 4 shows a diagram of a beacon transmission interval.

FIG. 4 depicts a diagram of several beacon transmission intervals (BTI) according to an aspect of this disclosure, i.e. shows the AP TX and STA RX training procedure (also called beacon transmission phase) assuming that the STA has N different receive patterns which it intends to train. Each DMG (directional multi-gigabit) beacon frame that is transmitted in a BTI uses a dedicated direction or sector (i.e. a dedicated transmit beam, also referred to as "third directive transmit beam" herein), which is signaled within the DMG beacon. Thus, a STA receiving a DMG beacon can retrieve the TX sector ID the AP used to transmit this particular beacon.

The first step of the operation in the BTI described above may remain unchanged at the AP side, i.e. the AP transmits identification data via various directive beams 40 ("third directive transmit beams"). In contrast to the known operation as described above, a STA listens with various directive receive beams 50 ("third directive receive beams"). Since the STA is not aligned to the frame structure at this point, a STA may apply its directive receive beam 50 for the duration of at least one beacon interval (BI). During the BI, the receive pattern shall be unchanged. The IEEE802.11ad standard defines the maximum duration of a BI up to 1000 ms, typical values are in the range of 100 ms. A STA listens continuously to the channel and applies thereby its directive receive patterns successively. After all directive receive patterns have been applied, either an AP has been detected (case A) or no AP has been detected (case B).

In case A, the STA intends to communicate in a double directive A-BFT (DD-A-BFT) phase and the STA saves the best AP transmit sector (e.g. as "second transmit beam information", also referred to as $TX_{AP}$) and best STA receive sector (e.g. as "second receive beam information", also referred to as $RX_{STA}$) The best sector can be determined by evaluating SNR, SINR, or link capacity for example.

A STA should only consider communicating within a DD-A-BFT under specific conditions: e.g., if (i) the received SNR with sectors $TX_{AP}$ and $RX_{STA}$ is below a threshold, or (ii) the data reception in previous BTI was not successful with a quasi-omni pattern, or (iii) the number of FailedRSSAttempts (number of unsuccessful association attempts) in regular A-BFT with quasi-omni pattern is above a threshold, or (iv) too many collisions arise in regular A-BFT triggering the need for spatial reuse in association phase. If the SNR is above this threshold, a STA shall consider a regular A-BFT. The threshold value in dB may be defined by $$\gamma_{target} + D_{STA,RX} + D_{AP,TX} - D_{STA,TX} - D_{AP,RX}$$

Thereby, $\gamma_{target}$ target denotes the target SNR of the Control PHY MCS in dB, which is the most robust modulation coding scheme (MCS) and which is applied in beamforming training. Furthermore, D denotes the beam directivity in dB of either STA or AP in either TX or RX mode, respectively.

In case B, no AP has been detected and the STA may repeat the listening procedure with various directive beams continuously or at a later point in time.

It should be noted that the AP may perform no special operations during this training phase. The modifications are mainly on STA side. Therefore, this approach can reuse any BTI such as described in IEEE802.11ad and/or IEEE802.11ay BTI. No dedicated double directive or long range BTI is required. Given that spatial reuse is the main objective of a STA, it may receive with an omni-directional pattern during a single BTI phase like it is done according to IEEE802.11ad. Prerequisite is that the link budget is sufficient to overcome path loss.

In a second phase (also called association beamforming training phase), the STA TX and AP RX procedure takes place in various DD-A-BFT slots. During a single DD-A-BFT slot, the STA uses different transmit sectors, one for each SSW frame. The AP keeps its receiver pattern unchanged during an entire DD-A-BFT slot, i.e. each SSW frame transmitted by the STA within one DD-A-BFT slot shall be received by the AP with the same receive beam or RX sector, respectively. Each DD-A-BFT slot uses different AP receiver patterns. In contrast to known procedures, a STA transmits SSW frames in all DD-A-BFT slots in order to cover all possible beam combinations.

In case of reciprocity, the channel, the applied beams, and the antennas are independent and invariant with respect to the communication direction, i.e. TX and RX beams have same properties and are similar in point of main lobe directivity and HPBW; location of side lobes is not important as long as the side lobe attenuation is large enough). Channel reciprocity is a prerequisite for having beam and/or antenna reciprocity which is an implementation property. For this reason, beam and/or antenna reciprocity can be either on STA and/or AP side or it is not available at all, i.e. this property is device specific. In order to keep the notation simple, the term reciprocity is used in the following. In case of single antenna systems, reciprocity includes channel and beam reciprocity. In case of multi-antenna systems antenna reciprocity is an additional prerequisite.

Figure 5:
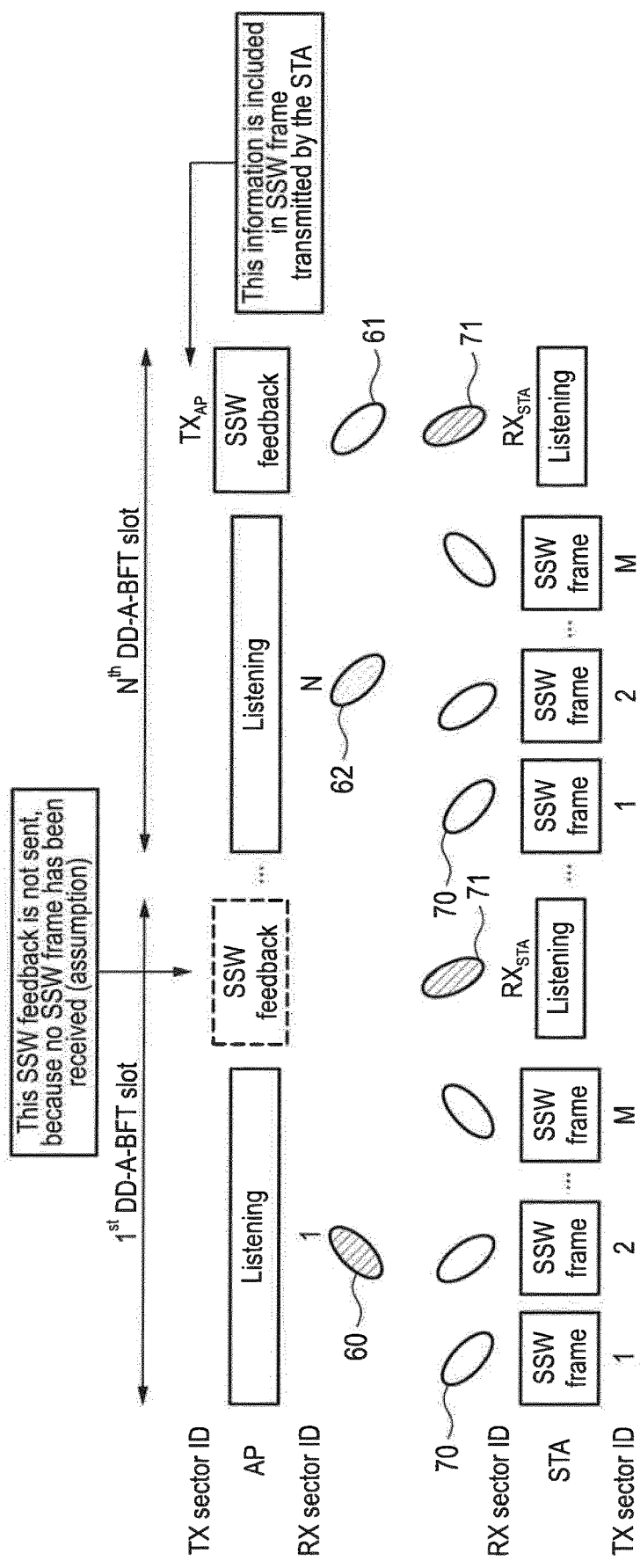
FIG. 5 shows a diagram of a first embodiment of association beamforming training with a single STA.

First, the case shall be considered where reciprocity is available neither at AP nor at STA side. FIG. 5 shows a diagram of a first embodiment of association beamforming training with a single STA. In each of the DD-A-BFT slots, the AP listens with a directive beam 60, 62, respectively ("first directive receive beam"). Each DD-A-BFT slot may have a different beam 60, 62 (it may be beneficial to use same receive beam in various DD-A-BFT slots, as will be explained later).

The STA is transmitting several SSW frames within one or more A-BFT slots, starting from the first A-BFT slot of the DD-A-BFT. In each DD-A-BFT slot, a STA can sweep through M different transmit patterns, i.e. use different directive beams 70 ("first directive transmit beams"). Thereby each SSW frame holds information about the best received AP transmit sector ($TX_{AP}$, "second transmit beam information") determined in the BTI phase (see FIG. 4) and the current transmit sector of the STA. In order to receive the SSW feedback ("response"), a STA uses its best RX beam 71 as indicated by $RX_{STA}$ ("second receive beam information") determined earlier in the BTI phase.

The number of slots N and the number M of SSW frames per slot may be signaled in the beacon interval control field (see below) and determined by the AP. In case a STA supports less than M transmit sectors, it shall stop transmission within the current slot after having completed all its transmit patterns and continue in the next DD-A-BFT slot if necessary. In case a STA supports more than M transmit sectors, it shall transmit only M selected sectors within a slot. The selection procedure is STA specific and may comprise an angular interpolation between available sectors.

In terms of the SSW feedback, the following rules are preferably applied in an embodiment:
1. If the AP was able to decode a SSW frame sent by a STA, it transmits a SSW feedback ("response"), preferably with TX sector information data contained in the SSW frame ($TX_{STA}$, "first transmit beam information") and using a directive transmit beam 61 indicated by $TX_{AP}$ ("second transmit beam information").
2. A SSW feedback is not sent if there has been no decodable SSW frame or if several STAs have been received simultaneously (collision). A collision is defined as a SSW frame received from at least two STAs simultaneously. More than one valid SSW frame reception from more than one STAs within a DD-A-BFT slot is not considered to be a collision but as feedback congestion. It shall be noted that some standards define a collision as two STAs using the same A-BFT slot even though the STAs access different SSW frames.
3. In case more than one SSW frames from more than one different STAs have been received during a DD-A-BFT slot (feedback congestion), the SSW feedback is addressed to the strongest STA. Pending SSW feedbacks may be addressed in future DD-A-BFT slots within same DD-A-BFT. In this case the same rule of sending the SSW feedback to the strongest STA applies. At the end of a DD-A-BFT phase, all pending SSW feedbacks shall be neglected.
4. In case a STA received a SSW feedback, it stops transmitting in further DD-A-BFT slots within the current BTI. This is to ensure that DD-A-BFT slots can be used for further stations to associate.
5. In case a STA received no feedback it may schedule transmission in a further DD-A-BFT slot but keeps listening to the channel during all SSW feedback phases of same DD-A-BFT phase. This is to ensure that a STA can receive a SSW feedback frame at a later point in time in case of feedback congestion.

In FIG. 5 it is assumed that the AP receives a valid SSW frame in the $N^{th}$ DD-A-BFT slot. Therefore, there is only one SSW feedback sent at the end of the $N^{th}$ DD-A-BFT slot.

In contrast to known operations, where STAs choose randomly a single A-BFT slot for doing their sector sweep (in case a STA cannot finish its sector sweep, it may continue in the next slot), STAs transmit in some embodiments from the beginning of the first DD-A-BFT slot. The likelihood of a collision is reduced by the fact that the AP uses directive receive beams, instead of an omni-directional pattern. A collision arises if within one SSW frame interval of one DD-A-BFT slot signals from two or more STAs have been received with similar power. Since the AP applies directive receive patterns, collision probability is lower compared to quasi-omni reception.

The above rule 3 applies, if the AP received more than one valid SSW frame from more than one STA. Because two frames have not been received at the same time, it is not a collision. At this point, the AP should send two SSW feedbacks which may be not possible (as in IEEE 802.11ad specification) leading to feedback congestion which needs to be resolved. Therefore, the AP transmits to the STA received strongest (in terms of SNR, SINR, or capacity for example) and the AP uses one of the upcoming SSW feedback opportunities to address the weak STA. Alternatively, frame structures to allow for simultaneous feedback to multiple STAs can be envisioned. In this case, the SSW feedback may be sent simultaneously to all or a set of the STAs that were received within the same DD-A-BFT slot.

Figure 6:
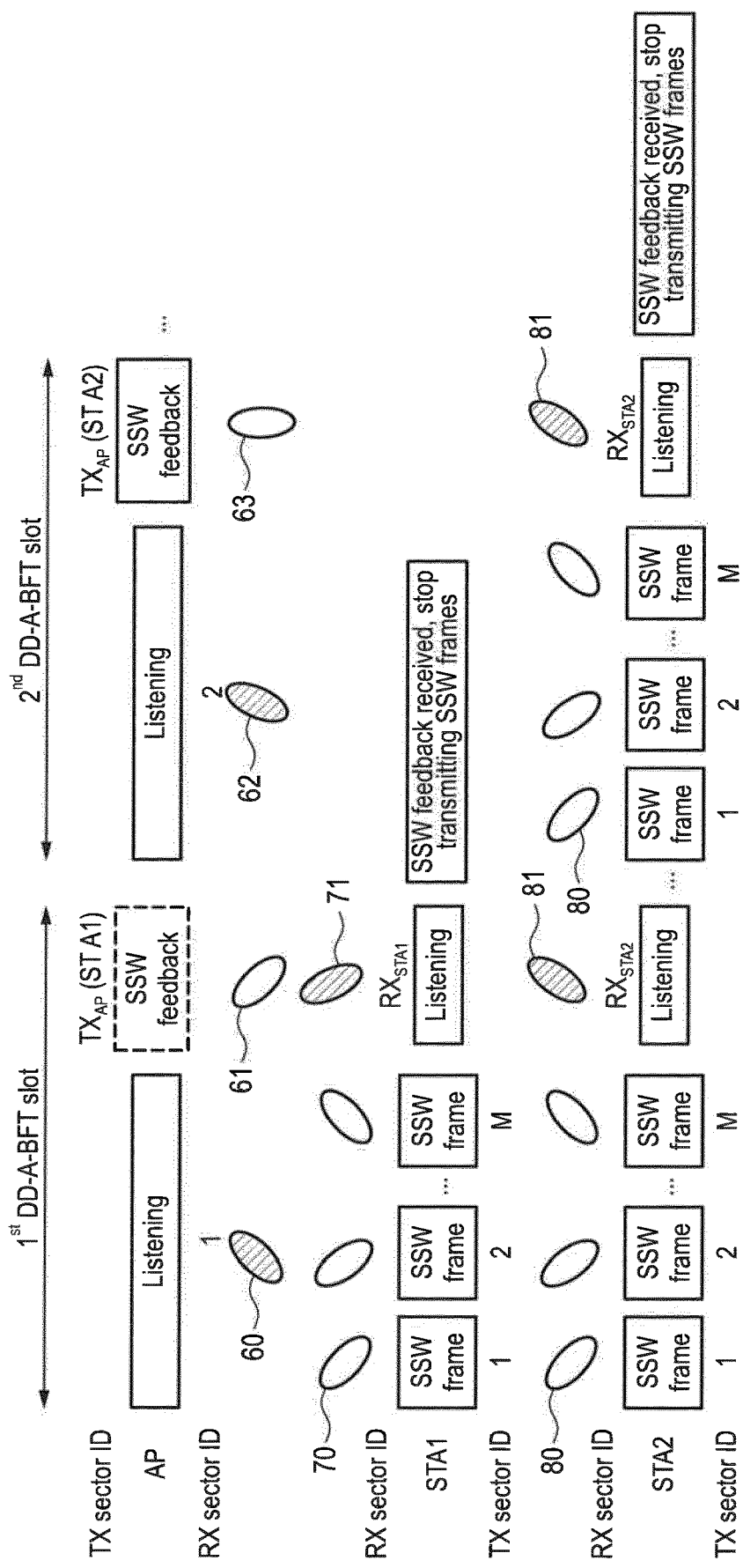
FIG. 6 shows a diagram of a second embodiment of association beamforming training with a two STAs.

FIG. 6 shows a diagram of a second embodiment of association beamforming training with a two STAs associating simultaneously. It is assumed that STA 1 and STA 2 have been able to associate in the first and second DD-A-BFT slot, respectively. If a SSW feedback has been received, both AP and STAs have knowledge of the best TX and RX sector ID to use for subsequent communications. Note that only TX sector information is required to be exchanged between AP and STA during SSW frames and SSW feedback, respectively.

In the example shown in FIG. 6, in a first sector sweep STA1 uses first directive transmit beams 70, STA2 uses first directive transmit beams 80 and AP listens using a first directive receive beam 60. Preferably, in the first directive transmit beams 70 and 80 the information about the best third transmit beam used by the AP in the beacon transmission interval for the respective STA (i.e. $TX_{AP}$(STA1) and $TX_{AP}$(STA2), "second transmit beam information") is included.

If during the first sweep the AP received a valid SSW frame only from STA1, it sends a SSW feedback ("response") that is addressed to STA1 using a second directive transmit beam 61 indicated by the second transmit beam information $TX_{AP}$(STA1) from STA1. Simultaneously, STA1 and STA2 listen with the respective second directive receive beam 71, 81 indicated by the second receive beam information $RX_{STA1}$ and $RX_{STA2}$. Since the SSW feedback is addressed to STA1, e.g. by including a corresponding identifier such as MAC address, AID (association identifier), or pre-AID, STA1 now knows its best sector (i.e. its best directive transmit beam) to use for subsequent communication since this information is included in the SSW feedback transmitted with 61. STA1 can now stop transmitting SSW frames in subsequent slots.

Subsequently, in a second sector sweep, STA2 uses first directive transmit beams 80 AP listens using a first directive receive beam 62. If the AP received a valid SSW frame from STA2 it sends a SSW feedback ("response") that is addressed to STA2 and uses a second directive transmit beam 63 indicated by the second transmit beam information $TX_{AP}$(STA2) from STA2. Simultaneously, STA2 listens with the respective second directive receive beam 81 indicated by the second receive beam information $RX_{STA2}$. Since the SSW feedback is addressed to STA2, e.g. by including a corresponding identifier, STA2 now knows its best sector (i.e. its best directive transmit beam) to use for subsequent communication since this information is included in the SSW feedback 63. STA2 can now stop transmitting SSW frames in subsequent slots.

Figure 7:
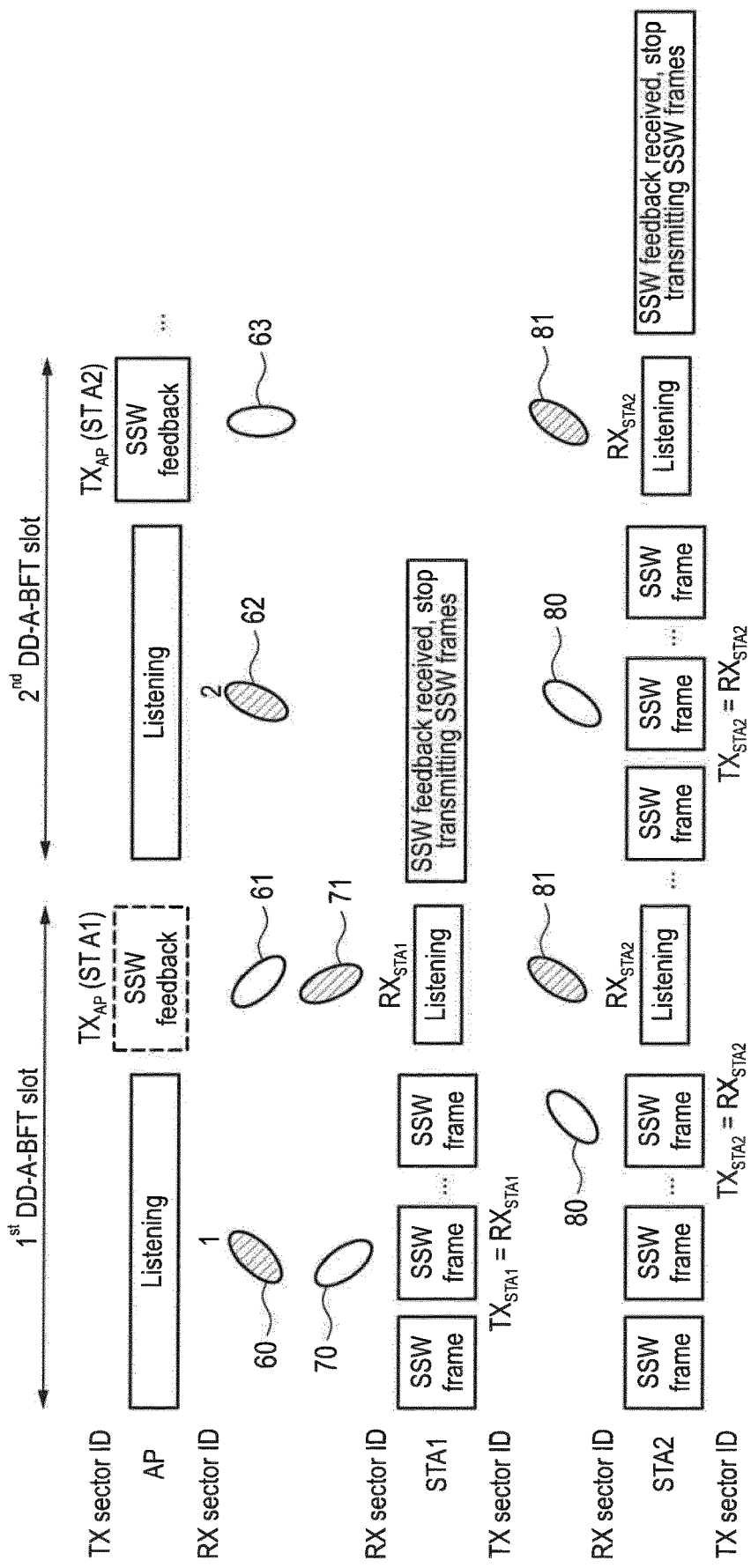
FIG. 7 shows a diagram of a third embodiment of association beamforming training with a two STAs employing reciprocity.

FIG. 7 shows a diagram of a third embodiment of association beamforming training with two STAs employing reciprocity. In this case, a STA has already the information about its best TX beam namely the best RX beam, i.e. $TX_{STA}=RX_{STA}$ (equal sign should be interpreted as described above). In this case, a STA transmits randomly only one SSW frame within each DD-A-BFT slot using $TX_{STA}=RX_{STA}$. This is to vacate the DD-A-BFT slots for other STAs competing for association in the same BI. FIG. 7 shows the basic procedure for two STAs (no collision or feedback congestion assumed). Dashed SSW frames indicate frames that are not transmitted but are virtual placeholders (SSW frame transmit opportunities).

Furthermore, if it is known by the STA when the AP uses a particular received pattern and if the AP features reciprocity, it transmits only one SSW frame in each DD-A-BFT slot where the AP receives with the desired receive beam. Since the STA knows best $TX_{AP}$ sector, it is also aware of the best $RX_{AP}$ sector ($TX_{AP}=RX_{AP}$). If the sweep sequence of TX and RX beams is equal, the STA can predict, when the AP applies the appropriate receive pattern in DD-A-BFT. Alternatively, the Rx sectors, which the AP is going to use in DD-A-BFT, can be signaled within the DMG beacon. In this case, a single STA can occupy randomly even only one SSW slot within all DD-A-BFT slots during a BI. However, for more robustness, a single STA can occupy several SSW slots in order to train more (e.g. neighboring) RX sectors at AP and/or it can use more SSW frames within a slot in order to train more of its own TX sectors (e.g. TX sectors that are neighbors of the RX sectors on which the highest SNR was received during the AP SSW in BTI).

If the AP features reciprocity but the STA does not, a STA transmits only in that single slot where the AP applies the appropriate receive sector, i.e. $RX_{AP}=TX_{AP}$. This requires the STA to be aware in which slot the AP applies a dedicated receive sector.

It should be noted that all four variants—no reciprocity, STA reciprocity, AP reciprocity, AP and STA reciprocity—can be applied independently and simultaneously. There is no requirement that all associating STAs have same properties or access rules.

In current IEEE 802.11ad specification, an AP supports only a round-trip-time delay of 1 µs, which corresponds to a maximum range of 150 m. It is proposed to change this value to multiples of 1 µs using e.g. the "Coverage Class field" as defined in the IEEE 802.11 standard. At the moment this field is not applicable for mmWave communication.

All variable parameters may be signaled in the Beacon Interval Control field shown in FIG. 8, which is part of DMG beacon frame body. For example: A-BFT length field indicates the number of A-BFT slots (1 up to 8); FSS indicates the number of SSW frame slots within one A-BFT slot (1 up to 16); Next A-BFT field indicates the number of BI during which the A-BFT is not present; N BIs A-BFT field indicates the interval, in number of beacon intervals, at which the AP allocates an A-BFT. All other fields are described the IEEE 802.11 standard.

For DD-A-BFT, the minimal change required is an indication if the upcoming A-BFT is a DD-A-BFT. It is proposed to use a single bit of the reserved bits (B44 to B47 in FIG. 8) to indicate a DD-A-BFT.

A further option to signal a DD-A-BFT is to add a further control field in the DMG beacon frame body shown in FIG. 9. The DMG beacon frame body can hold several partly optional signaling fields and therefore its length is variable. Thus, several options to signal a DD-A-BFT can be possibly implemented:

Introduction of a simple DD-A-BFT control field with the structure show in FIG. 10.

DD-A-BFT length field indicates the number of DD-A-BFT slots (1 up to 8).

FSS field indicates the number of SSW frame slots within one DD-A-BFT slot (1 up to 16).

Next DD-A-BFT field indicates the number of BI during which the DD-A-BFT is not present.

DD-A-BFT count field indicates the number of DD-A-BFTs since the STA sending the DMG Beacon frame last switched RX DMG antennas for a DD-A-BFT. A value of 0 indicates that the DMG antenna used in the forthcoming DD-A-BFT differs from the DMG antenna used in the last DD-A-BFT.

N-DD-A-BFT in Ant field indicates how many A-BFTs the STA sending the DMG Beacon frame receives from each DMG antenna.

Introduction of an advanced DD-A-BFT control field (see FIG. 11), which enables the AP to use several DD-A-BFT phases to train all receive sectors in case number of beams to be tested is larger than the number of DD-A-BFT slots as signaled in DD-A-BFT length field. This is indicated by 'fragmented DD-A-BFT bit. The number of required DD-A-BFT slots is indicated by DD-A-BFT span'.

If it is assumed that there is a total of N non-overlapping receive patterns, each receive pattern can contribute a gain of roughly $10 \log_{10}N$ dB of link budget which results in $\sqrt{N}$ fold link distance according to the free space path loss formula for example.

Further if N different non-overlapping receive patterns are assumed, collision probability of STAs joining at same time can be reduced by factor N, if STAs are assumed to be equally spatially distributed.

By use communication devices and methods according to the present disclosure several advantages can be achieved. In particular: long range AP discovery for mmWave systems; increase of roughly $10 \log_{10}M$ dB in link budget in association phase; improved channel access in case of reciprocity; and spatial reuse in association phase, i.e. spatial beam properties are exploited for association phase Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A communication device (1) for RF-based communication with another communication device (2), said communication device (1) comprising:
   an antenna circuitry (10) configured to transmit and receive RF signals, and
   a beamforming circuitry (11) configured to perform beamforming and to control the antenna circuitry in a beamforming training phase to transmit and/or receive RF signals using one or more selected directive beams, wherein the beamforming circuitry (11) is configured to perform beamforming training by controlling the antenna circuitry
   i) to transmit data using at least one first directive transmit beam, wherein the other communication device (2) is configured to listen using a first directive receive beam, said data including a second transmit beam information, and
   ii) to subsequently listen using a predetermined second directive receive beam for a response from the other communication device (2), which is configured to transmit, if the data transmitted in step i) have been received, a response using a second directive transmit beam indicated by the second transmit beam information.

2. The communication device as defined in any one of the preceding embodiments,
   wherein the beamforming circuitry (11) is configured to control the antenna circuitry to successively transmit the data in step i) with a number of different first directive transmit beams.

3. The communication device as defined in embodiment 2,
   wherein the beamforming circuitry (11) is configured to control the antenna circuitry to transmit a predefined number of first directive beams as signaled by the other communication device in a previous training phase or a beacon transmission phase.

4. The communication device as defined in embodiment 2 or 3,
   wherein the beamforming circuitry (11) is configured to obtain from the response received in step ii) a first transmit beam information indicating at least one of the first directive transmit beams by which the data, which have been received by the second communication device (2), have been transmitted by the communication device (1).

5. The communication device as defined in any one of the preceding embodiments,
   wherein the beamforming circuitry (11) is configured to control the antenna circuitry to transmit the data in step i) with a single first directive transmit beam.

6. The communication device as defined in embodiment 5,
   wherein the beamforming circuitry (11) is configured to control the antenna circuitry to transmit the data in step i) with the same or different single first directive transmit beams in subsequent iterations of step i).

7. The communication device as defined in embodiment 5 or 6,
   wherein the beamforming circuitry (11) is configured to control the antenna circuitry to use the same beam as first directive transmit beam and second directive receive beam.

8. The communication device as defined in any one of the preceding embodiments,
   wherein the beamforming circuitry (11) is configured to decide in step ii) that a response has been received if it includes a first identifier of the communication device (1).

9. The communication device as defined in any one of the preceding embodiments,
   wherein the beamforming circuitry (11) is configured to control the antenna circuitry to carry out, in a beacon transmission phase prior to the beamforming training phase, the steps of
   a) listening using a third receive beam while the other communication device (2) transmits a second identifier of the other communication device (2) subsequently using different third directive transmit beams, and
   b) setting, once the second identifier has been received, the third directive transmit beam used for transmitting the second identifier as second directive transmit beam indicated by the second transmit beam information.

10. The communication device as defined in embodiment 9,
    wherein the beamforming circuitry (11) is configured to control the antenna circuitry
    to listen, in step a), by successively using different third directive receive beams, while in each succession the other communication device (2) subsequently uses different third directive transmit beams and
    by setting, in step b), the third directive receive beam with which the second identifier has been received, as second directive receive beam.

11. A communication method for RF-based communication with another communication device (2), said communication method controlling an antenna circuitry in a beamforming training phase to transmit and/or receive RF signals using one or more selected directive beams by i) transmitting data using at least one first directive transmit beam, wherein the other communication device (2) is configured to listen using a first directive receive beam, said data including a second transmit beam information, and ii) subsequently listening using a predetermined second directive receive beam for a response from the other communication device (2), which is configured to transmit, if the data transmitted in step i) have been received, a response using a second directive transmit beam indicated by the second transmit beam information.

12. A communication device (2) for RF-based communication with another communication device (1), said communication device (2) comprising:
an antenna circuitry (20) configured to transmit and receive RF signals, and
a beamforming circuitry (21) configured to perform beamforming and to control the antenna circuitry, in a beamforming training phase, to transmit and/or receive RF signals using one or more selected directive beams, wherein the beamforming circuitry (21) is configured to perform beamforming training by controlling the antenna circuitry
  i) to listen using a first directive receive beam for data transmitted by the other communication device (1) using at least one first directive transmit beam, said data including a second transmit beam information, and
  ii) to subsequently transmit, if the data transmitted in step i) have been received, a response using a second directive transmit beam indicated by the second transmit beam information, wherein the other communication device (1) is configured to listen using a predetermined second directive receive beam.

13. The communication device as defined in embodiment 12,
wherein the beamforming circuitry (21) is configured to include in the response a first transmit beam information indicating the first directive transmit beam by which the data, which have been received by the communication device (2), have been transmitted by the other communication device (1).

14. The communication device as defined in embodiment 12 or 13,
wherein the beamforming circuitry (21) is configured to control the antenna circuitry to include in the response a first identifier of the other communication device (1) from which the data have been received.

15. The communication device as defined in embodiment 14,
wherein the beamforming circuitry (21) is configured to control the antenna circuitry to include in the response a first identifier of another communication device from which the data have been received with highest quality or SNR.

16. The communication device as defined in any one of the embodiments 12 to 15,
wherein the beamforming circuitry (21) is configured to control the antenna circuitry to transmit a response only if data have been received in step i) with a quality or SNR above a predetermined threshold.

17. The communication device as defined in any one of the embodiments 12 to 15,
wherein the beamforming circuitry (21) is configured to control the antenna circuitry to perform beacon transmission, prior to beamforming training, by transmitting a second identifier of the second communication device (2) subsequently using different third directive transmit beams, while the other communication device (1) is configured to listen using a third receive beam.

18. The communication device as defined in any one of the embodiments 12 to 15,
wherein the beamforming circuitry (21) is configured to maintain an ordered list of other communication devices and their respective first transmit beam information from which data have successfully been received and/or wherein the beamforming circuitry (21) is configured to control the antenna circuitry to include in the response one identifier and first transmit beam information of the ordered list while removing this data from the ordered list.

19. A communication method for RF-based communication with another communication device (1), said communication method controlling an antenna circuitry, in a beamforming training phase, to transmit and/or receive RF signals using one or more selected directive beams by
  i) listening using a first directive receive beam for data transmitted by the other communication device (1) using at least one first directive transmit beam, said data including a second transmit beam information, and
  ii) subsequently transmitting, if the data transmitted in step i) have been received, a response using a second directive transmit beam indicated by the second transmit beam information, wherein the other communication device (1) is configured to listen using a predetermined second directive receive beam.

20. A non-transitory computer-readable recording medium that stores therein a computer program product, which, when executed by a processor, causes the method according to embodiment 11 or 19 to be performed.

21. A computer program comprising program code means for causing a computer to perform the steps of said method according to embodiment 11 or 19 when said computer pro-gram is carried out on a computer.

22. The communication device as defined in any one of embodiments 1 to 10,
wherein the beamforming circuitry (11) is configured to repeat steps i) and ii) if no response is received in step ii).

23. The communication device as defined in any one of embodiments 12 to 18,
wherein the beamforming circuitry (21) is configured to repeat steps i) and ii) by using different first predetermined directive receive beams in step i).

The invention claimed is:

1. A communication device for radio frequency (RF)-based communication with another communication device, said communication device comprising:
  antenna circuitry configured to transmit and receive RF signals; and
  beamforming circuitry configured to perform beamforming and to control the antenna circuitry in a beamforming training phase to transmit and/or receive RF signals using one or more selected directive beams, wherein
  the beamforming circuitry is configured to perform beamforming training by controlling the antenna circuitry to:
    i) transmit data using at least one first directive transmit beam, wherein the another communication device is configured to listen using a first directive receive beam, said data including a second transmit beam information, and
    ii) subsequently listen using a predetermined second directive receive beam for a response from the another communication device, which is configured to transmit, if the data transmitted in step i) have been received, a response using a second directive transmit beam indicated by the second transmit beam information, the response message including a first identifier of the communication device from which the data has been received.

2. The communication device of claim 1, wherein the beamforming circuitry is configured to control the antenna circuitry to successively transmit the data in step i) with a number of different first directive transmit beams.

3. The communication device of claim 2, wherein the beamforming circuitry is configured to control the antenna circuitry to transmit a predefined number of first directive beams as signaled by the another communication device in a previous training phase or a beacon transmission phase.

4. The communication device of claim 2, wherein the beamforming circuitry is configured to obtain from the response received in step ii) first transmit beam information indicating at least one of the first directive transmit beams by which the data, which has been received by the another communication device, has been transmitted by the communication device.

5. The communication device of claim 1, wherein the beamforming circuitry is configured to control the antenna circuitry to transmit the data in step i) with a single first directive transmit beam.

6. The communication device of claim 5, wherein the beamforming circuitry is configured to control the antenna circuitry to transmit the data in step i) with the same or different single first directive transmit beams in subsequent iterations of step i).

7. The communication device of claim 5, wherein the beamforming circuitry is configured to control the antenna circuitry to use the same beam as first directive transmit beam and second directive receive beam.

8. The communication device of claim 1, wherein the beamforming circuitry is configured to decide in step ii) that a response has been received if it includes a first identifier of the communication device and/or to repeat steps i) and ii) if no response is received in step ii).

9. The communication device as claimed in claim 1, wherein the beamforming circuitry is configured to control the antenna circuitry to carry out, in a beacon transmission phase prior to the beamforming training phase, the steps of:
a) listening using a third receive beam while the another communication device transmits a second identifier of the another communication device subsequently using different third directive transmit beams; and
b) setting, once the second identifier has been received, the third directive transmit beam used for transmitting the second identifier as second directive transmit beam indicated by the second transmit beam information.

10. The communication device as claimed in claim 9, wherein the beamforming circuitry is configured to control the antenna circuitry to:
listen, in step a), by successively using different third directive receive beams, while in each succession the another communication device subsequently uses different third directive transmit beams; and
set, in step b), the third directive receive beam with which the second identifier has been received, as second directive receive beam.

11. A communication method for radio frequency (RF)-based communication with another communication device, said communication method controlling an antenna circuitry in a beamforming training phase to transmit and/or receive RF signals using one or more selected directive beams by:

i) transmitting data using at least one first directive transmit beam, wherein the another communication device is configured to listen using a first directive receive beam, said data including a second transmit beam information; and
ii) subsequently listening using a predetermined second directive receive beam for a response from the another communication device, which is configured to transmit, if the data transmitted in step i) has been received, a response using a second directive transmit beam indicated by the second transmit beam information, the response message including a first identifier of a communication device from which the data has been received.

12. A communication device for RF-based communication with another communication device, said communication device comprising:
antenna circuitry configured to transmit and receive RF signals; and
beamforming circuitry configured to perform beamforming and to control the antenna circuitry, in a beamforming training phase, to transmit and/or receive RF signals using one or more selected directive beams, wherein
the beamforming circuitry is configured to perform beamforming training by controlling the antenna circuitry to:
i) listen using a first directive receive beam for data transmitted by the another communication device using at least one first directive transmit beam, said data including a second transmit beam information; and
ii) subsequently transmit, if the data transmitted in step i) has been received, a response using a second directive transmit beam indicated by the second transmit beam information, wherein the response message includes a first identifier of the another communication device from which the data has been received, and the another communication device is configured to listen using a predetermined second directive receive beam.

13. The communication device of claim 12, wherein the beamforming circuitry is configured to include in the response a first transmit beam information indicating the first directive transmit beam by which the data, which has been received by the communication device, has been transmitted by the another communication device.

14. The communication device of claim 12, wherein the beamforming circuitry is configured to control the antenna circuitry to include in the response a first identifier of another communication device from which the data have been received with highest quality or SNR.

15. The communication device of claim 12, wherein the beamforming circuitry is configured to control the antenna circuitry to transmit a response only if data has been received in step i) with a quality or SNR above a predetermined threshold and/or to repeat steps i) and ii) by using different first predetermined directive receive beams in step i).

16. The communication device of claim 12, wherein the beamforming circuitry is configured to control the antenna circuitry to perform beacon transmission, prior to beamforming training, by transmitting a second identifier of the another communication device subsequently using different third directive transmit beams, while the another communication device is configured to listen using a third receive beam.

17. The communication device of claim 12, wherein the beamforming circuitry is configured to maintain an ordered list of other communication devices and their respective first transmit beam information from which data has successfully been received and/or wherein the beamforming circuitry is configured to control the antenna circuitry to include in the response one identifier and first transmit beam information of the ordered list while removing this data from the ordered list.

18. A communication method for radio frequency (RF)-based communication with another communication device, said communication method controlling an antenna circuitry, in a beamforming training phase, to transmit and/or receive RF signals using one or more selected directive beams by:

i) listening using a first directive receive beam for data transmitted by the another communication device using at least one first directive transmit beam, said data including a second transmit beam information; and ii) subsequently transmitting, if the data transmitted in step i) has been received, a response using a second directive transmit beam indicated by the second transmit beam information, wherein the response message includes a first identifier of the another communication device from which the data has been received, and the another communication device is configured to listen using a predetermined second directive receive beam.

19. A non-transitory computer-readable recording medium that stores therein a computer program product, which, when executed by a processor, causes the method according to claim 11 to be performed.

* * * * *